(12) United States Patent
Tsai et al.

(10) Patent No.: US 11,653,732 B2
(45) Date of Patent: May 23, 2023

(54) RECEIVING BOX FOR HEARING ASSISTANCE DEVICE

(71) Applicants: Dai-Yun Tsai, Taipei (TW); Ting-Wei Wu, Taipei (TW); Wei-Chih Hsu, Taipei (TW); Chia-Yang Hsu, Taipei (TW)

(72) Inventors: Dai-Yun Tsai, Taipei (TW); Ting-Wei Wu, Taipei (TW); Wei-Chih Hsu, Taipei (TW); Chia-Yang Hsu, Taipei (TW)

(73) Assignee: COMPAL ELECTRONICS, INC., Taipei (TW)

( * ) Notice: Subject to any disclaimer, the term of this patent is extended or adjusted under 35 U.S.C. 154(b) by 225 days.

(21) Appl. No.: 17/144,160

(22) Filed: Jan. 8, 2021

(65) Prior Publication Data

US 2022/0183434 A1      Jun. 16, 2022

(30) Foreign Application Priority Data

Dec. 10, 2020   (TW) .................................. 109143681

(51) Int. Cl.
*A45C 11/24*        (2006.01)
*A45C 15/00*        (2006.01)
(Continued)

(52) U.S. Cl.
CPC .............. *A45C 11/24* (2013.01); *A45C 15/00* (2013.01); *H02J 7/0044* (2013.01); *H04R 1/02* (2013.01); . *H04R 25/65* (2013.01); *A45C 2011/001* (2013.01)

(58) Field of Classification Search
CPC ................ H04R 25/505; H04R 25/602; H04R 2460/17; H04R 2225/55; H04R 2225/31; H04R 1/083; H04R 2499/11; H04R 2225/43; H04R 2420/07; H04R 25/30; H04R 2201/103; H04R 25/556; H04R 25/603; H04R 1/02; H04R 25/65;
(Continued)

(56) References Cited

U.S. PATENT DOCUMENTS 10,491,024 B2    11/2019   Olson et al.
10,681,446 B2     6/2020   Chawan et al.
(Continued)

FOREIGN PATENT DOCUMENTS

CN        208797616          4/2019
CN        208971752          6/2019
(Continued)

OTHER PUBLICATIONS

"Office Action of Taiwan Counterpart Application", dated Jul. 9, 2021, p. 1-p. 10.

*Primary Examiner* — Fan S Tsang
*Assistant Examiner* — Julie X Dang
(74) *Attorney, Agent, or Firm* — JCIPRNET

(57) ABSTRACT

A receiving box for two hearing assistance devices including a housing, a cover, and an L-shaped hinge is provided. The housing includes a hinge recess, and two receiving slots independent of each other. The two receiving slots are configured to respectively receive the hearing assistance devices. The L-shaped hinge includes two opposite ends. One end is pivoted in the hinge recess, and the other end is fixed to the cover.

40 Claims, 12 Drawing Sheets

(51) Int. Cl.
*H04R 25/00* (2006.01)
*H02J 7/00* (2006.01)
*H04R 1/02* (2006.01)
*A45C 11/00* (2006.01)

(58) Field of Classification Search
CPC ...... H02J 7/0013; H02J 50/00; H02J 2310/23; H02J 50/10; H02J 7/0044; A45C 11/24; A45C 15/00; A45C 2011/001
See application file for complete search history.

(56) References Cited

U.S. PATENT DOCUMENTS

| | | | |
|---|---|---|---|
| 2018/0123367 A1* | 5/2018 | Higgins | H01R 13/2414 |
| 2019/0089187 A1* | 3/2019 | Konomi | H02J 50/70 |
| 2019/0208342 A1* | 7/2019 | Higgins | H04R 25/602 |
| 2019/0239004 A1* | 8/2019 | Mueller | H02J 7/0044 |
| 2020/0245079 A1* | 7/2020 | Ayache | H04R 25/60 |
| 2020/0366999 A1* | 11/2020 | Ayache | A61L 2/10 |
| 2021/0029424 A1* | 1/2021 | Wright | H04R 1/1025 |
| 2021/0176564 A1* | 6/2021 | Higgins | G06F 3/017 |
| 2021/0289282 A1* | 9/2021 | Onizuka | H02J 50/10 |
| 2022/0295934 A1* | 9/2022 | Adams | A42B 3/166 |

FOREIGN PATENT DOCUMENTS

| | | | |
|---|---|---|---|
| CN | 209994535 | | 1/2020 |
| CN | 209994535 U | * | 1/2020 |
| CN | 210629155 | | 5/2020 |
| JP | 2019057961 | | 4/2019 |
| TW | M569516 | | 11/2018 |
| WO | 2018219094 | | 12/2018 |

* cited by examiner

RECEIVING BOX FOR HEARING ASSISTANCE DEVICE

CROSS-REFERENCE TO RELATED APPLICATION

This application claims the priority benefit of Taiwanese application no. 109143681, filed on Dec. 10, 2020. The entirety of the above-mentioned patent application is hereby incorporated by reference herein and made a part of this specification.

BACKGROUND

Technical Field

The disclosure relates to a receiving box; particularly, the disclosure relates to a receiving box for hearing assistance devices.

Description of Related Art

Hearing assistance devices are hearing auxiliary tools specially designed for people with hearing loss, which typically adopt an audio processing module to perform optimization on received sounds, such as volume increasing, frequency changing, noise reduction, etc., so that the sounds are processed as strengthened sounds audible to people with hearing loss.

Moreover, for convenience of carrying, the hearing assistance devices are often accessorized with a receiving box for a user to receive and carry the hearing assistance devices. However, most of the existing receiving boxes only serve for storage, without taking the user's habit into consideration.

Besides, as important hearing auxiliary apparatuses, the hearing assistance devices are used at a high frequency and for a long time. Therefore, a special battery for the hearing assistance devices requires to be continuously discharged for a long time. In order to meet the requirement for the volume, the special battery of the hearing assistance devices is typically a button cell battery, and in order to meet the requirement for the long-term discharge, most of the hearing assistance devices still require replacement of the battery to be charged. Therefore, inconvenience still exists for the user since during replacement, it is necessary to carefully open the device manufactured to be extremely small in volume, remove the old battery, and then replace it with a new one.

Based on the above, how to provide a box device adapted for receiving, carrying, and charging based the above requirements, and meet ergonomic requirements of the user, has become an issue to be addressed.

SUMMARY

In the disclosure, a receiving box for hearing assistance devices is provided, meeting ergonomic requirements and being adapted for accommodating/receiving and charging the hearing assistance devices.

In the disclosure, a receiving box for hearing assistance devices includes a housing, a cover, and an L-shaped hinge. The housing includes a hinge recess, and two receiving slots independent of each other. The two receiving slots are configured to respectively receive two hearing assistance devices. The L-shaped hinge includes two opposite ends. One end is pivoted in the hinge recess of the housing, and the other end is fixed to the cover.

In an embodiment of the disclosure, the receiving box for hearing assistance devices also includes a charging module disposed in the housing.

In an embodiment of the disclosure, the charging module includes a plurality of electrical contacts located in the two receiving slots.

In an embodiment of the disclosure, the L-shaped hinge also includes a turning portion located between the two ends.

In an embodiment of the disclosure, when the cover is closed relative to the housing, the turning portion is received in the hinge recess, and the L-shaped hinge is completely shielded in the cover and the housing.

In an embodiment of the disclosure, when the cover is unfolded relative to the housing, the turning portion is moved out of the hinge recess.

In an embodiment of the disclosure, the L-shaped hinge also includes an abutting portion located between the two ends and adjacent to the housing.

In an embodiment of the disclosure, when the cover is closed relative to the housing, the abutting portion is received in the hinge recess.

In an embodiment of the disclosure, when the cover is unfolded relative to the housing so that the hearing assistance devices are adapted to be taken out, the abutting portion abuts against an inner wall of the housing to form a gap between the cover and the housing.

In an embodiment of the disclosure, the housing also includes a front side and a rear side opposite to each other.

In an embodiment of the disclosure, the two receiving slots are adjacent to the front side.

In an embodiment of the disclosure, the L-shaped hinge is located on the rear side.

In an embodiment of the disclosure, when the cover is closed relative to the housing, an opening seam is formed.

In an embodiment of the disclosure, the opening seam is lower than the one end on the front side.

In an embodiment of the disclosure, the opening seam is higher than the one end on the rear side.

In an embodiment of the disclosure, the housing also includes two wire receiving slots configured to respectively receive cables and receivers of the hearing assistance devices.

In an embodiment of the disclosure, the two receiving slots and the two wire receiving slots are mirror-symmetrical with each other.

In an embodiment of the disclosure, slot openings of the two wire receiving slots are higher than slot openings of the two receiving slots.

In an embodiment of the disclosure, a slot depth of the two wire receiving slots is greater than a slot depth of the two receiving slots.

In an embodiment of the disclosure, the two wire receiving slots include a neck portion, and the two receiving slots are adjacent to the neck portion.

In an embodiment of the disclosure, a slot opening width of the two wire receiving slots is gradually increased from the front side toward the rear side.

In an embodiment of the disclosure, a slot opening area of the two wire receiving slots is greater than or equal to twice a slot opening area of the two receiving slots.

In an embodiment of the disclosure, two wire receiving slots are independent of each other.

In an embodiment of the disclosure, the housing further includes a partition wall is located between the two wire receiving slots.

In an embodiment of the disclosure, a thickness of the partition wall on the rear side is d1, a thickness of the partition wall on the front side is d3, a thickness of the partition wall between the front side and the rear side is d2, and d1>d3>d2.

In an embodiment of the disclosure, the two receiving slots are respectively located in the two wire receiving slots.

In an embodiment of the disclosure, the two wire receiving slots are located adjacent to the front side respectively with the two receiving slots.

In an embodiment of the disclosure, the slot walls of the two wire receiving slots partially overlap slot walls of the two receiving slots.

In an embodiment of the disclosure, the two wire receiving slots and the two receiving slots are independent of each other.

In an embodiment of the disclosure, the two wire receiving slots are located between the two receiving slots.

In an embodiment of the disclosure, the two receiving slots are located between the two wire receiving slots.

In an embodiment of the disclosure, the housing also has a center line passing through the front side and the rear side.

In an embodiment of the disclosure, an angle is present between an axial direction of a long axis of the two wire receiving slots and the center line.

In an embodiment of the disclosure, a range of the angle is 30 degrees to 45 degrees.

In an embodiment of the disclosure, the receiving box for hearing assistance devices also includes a plurality of pads respectively disposed in the two receiving slots.

In an embodiment of the disclosure, the plurality of pads are located on edges of slot openings of the two receiving slots.

In an embodiment of the disclosure, the plurality of pads are located on slot walls of the two receiving slots.

In an embodiment of the disclosure, the slot walls of the two receiving slots include two opposite wall portions with a larger curvature and two opposite wall portions with a smaller curvature.

In an embodiment of the disclosure, the two opposite wall portions with the larger curvature and the two opposite wall portions with the smaller curvature form a closed contour.

In an embodiment of the disclosure, the plurality of pads are attached to the slot walls from an inside of the two receiving slots.

In an embodiment of the disclosure, the plurality of pads pass from an outside of the two receiving slots through openings of the slot walls to be assembled on the slot walls.

In an embodiment of the disclosure, the plurality of pads are located on the two opposite wall portions with the smaller curvature.

Based on the foregoing, the receiving box for hearing assistance devices includes the housing, the cover, the L-shaped hinge, and the charging module. One end of the L-shaped hinge is pivoted to the housing and the other end is fixed to the cover, forming the clamshell configuration. Moreover, the L-shaped hinge is pivotally disposed in the hinge recess of the housing, and thus exhibits a visual effect of hidden storage. Accordingly, the receiving box for hearing assistance devices is adapted for both receiving and charging the hearing assistance devices on the configuration basis of the above-mentioned components.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1A:
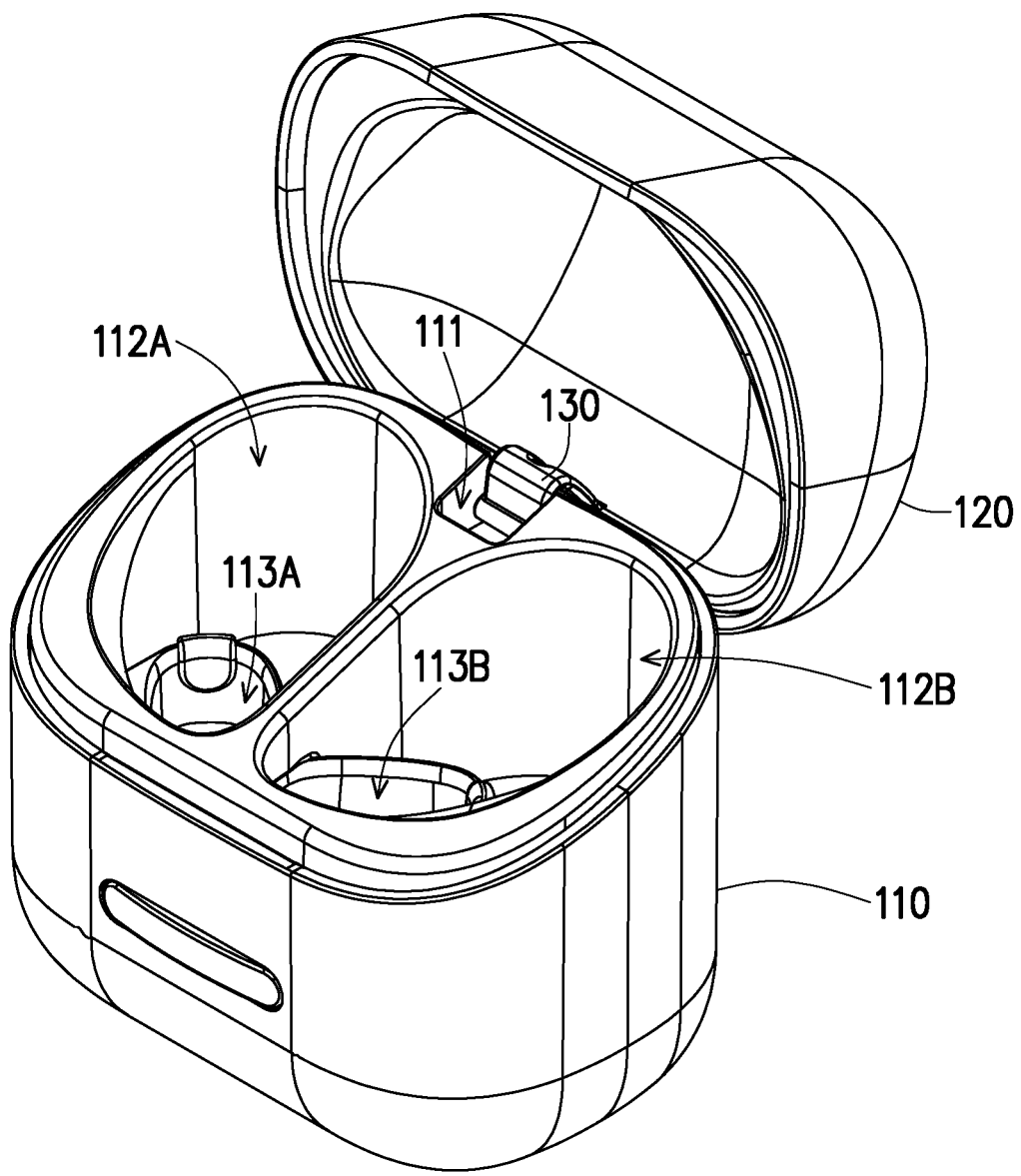
FIG. 1A is a schematic diagram of a receiving box for hearing assistance devices according to an embodiment of the disclosure.
Figure 1B:
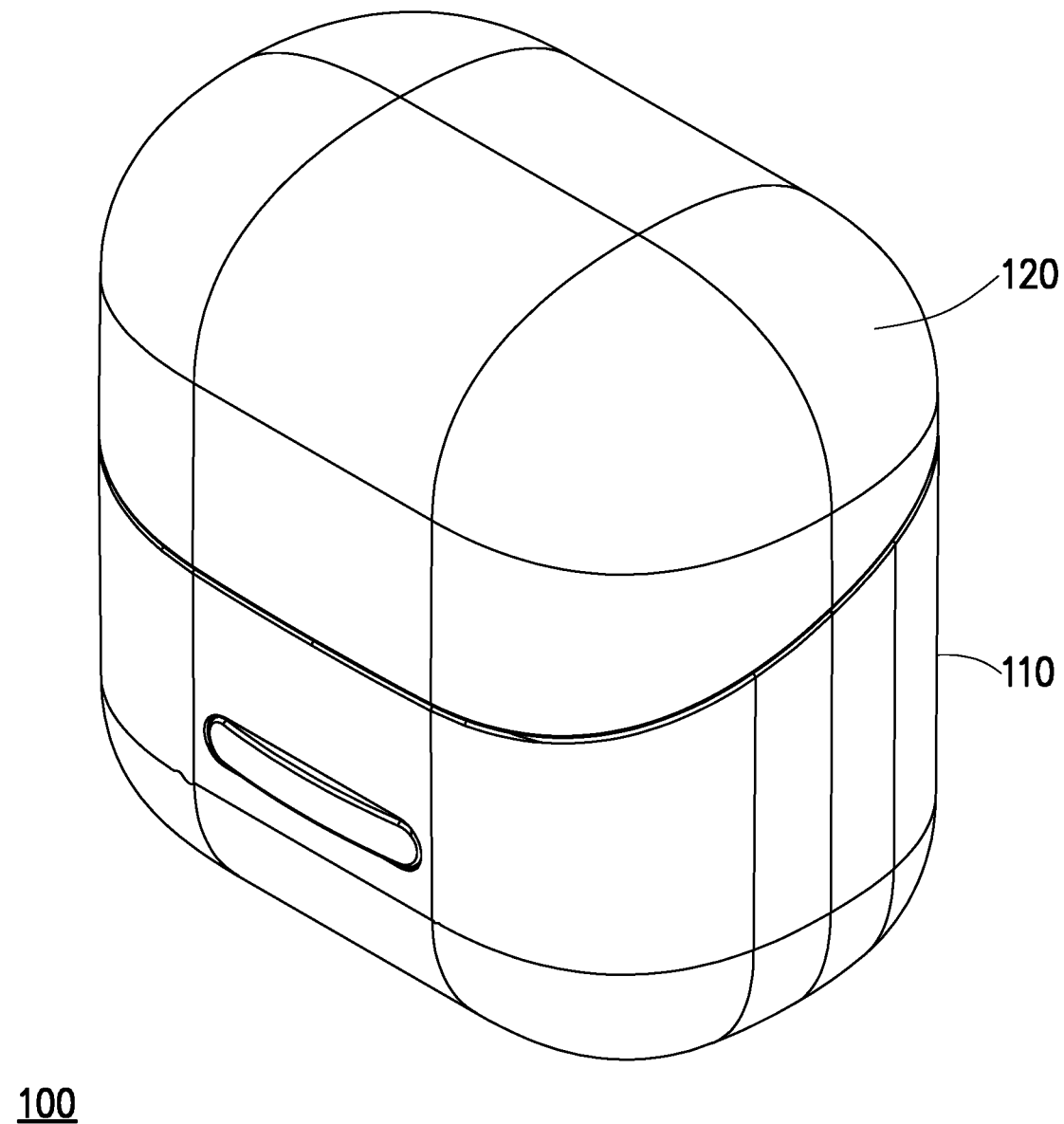
FIG. 1B is a schematic diagram of the receiving box for the hearing assistance devices of FIG. 1A in another state.

FIG. 1A is a schematic diagram of a receiving box for hearing assistance devices according to an embodiment of the disclosure. FIG. 1B is a schematic diagram of the receiving box for hearing assistance devices of FIG. 1A in another state. With reference to FIG. 1A and FIG. 1B together, in this embodiment, the receiving box 100 for hearing assistance devices includes a housing 110, a cover 120 and an L-shaped hinge 130. The housing 110 includes a hinge recess 111 and two receiving slots 113A, 113B, and the receiving slots 113A, 113B are independent of each other and not connected to each other. The housing 110 and the cover 120 are pivoted to each other through the L-shaped hinge 130. That is, the housing 110, the cover 120, and the L-shaped hinge 130 are adapted for each other to form a clamshell configuration, such that a cavity thereof serves for receiving the hearing assistance device. Herein, FIG. 1A shows an open (unfolded) state of the receiving box 100 for hearing assistance devices, and FIG. 1B shows a closed state.

Figure 2:
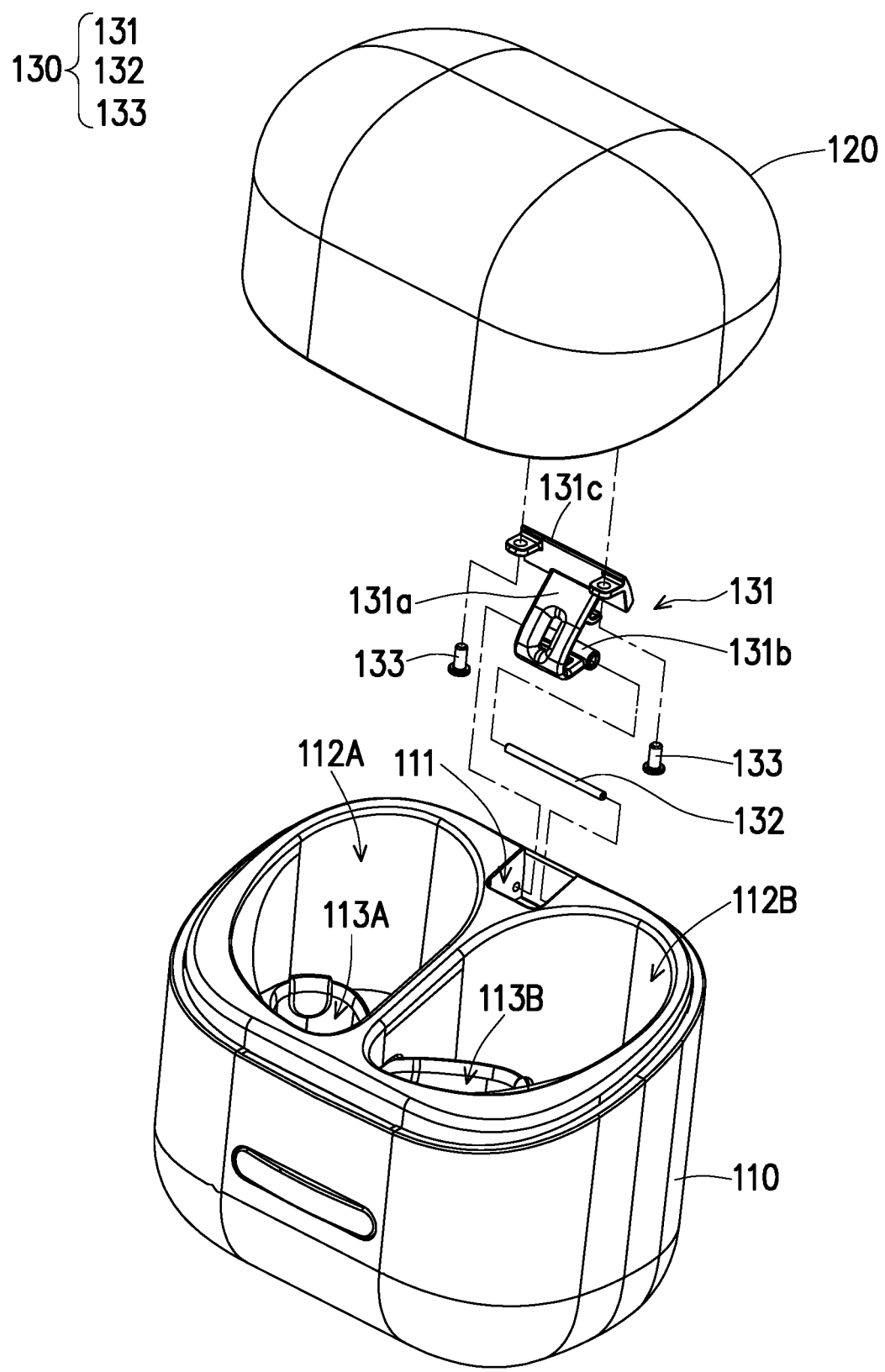
FIG. 2 is an exploded view of the receiving box for hearing assistance devices.

FIG. 2 is an exploded view of the receiving box for hearing assistance devices. With reference to FIG. 2, in this embodiment, the L-shaped hinge 130 includes a shaft 131, a pivoting element 132, and a fixing element 133. The shaft 131 includes an L-shaped portion 131a, a pivoting portion 131b, and a fixing portion 131c. As shown in FIG. 2, the fixing portion 131c is fixed to the cover 120 through the fixing element 133 to form a fixed end of the L-shaped hinge 130. The pivoting portion 131b is pivoted in the hinge recess 111 of the housing 110 through the pivoting element 132 to form a pivot end of the L-shaped hinge 130. The fixed end and the pivot end are two opposite ends of the L-shaped hinge 130.

Figure 3A:
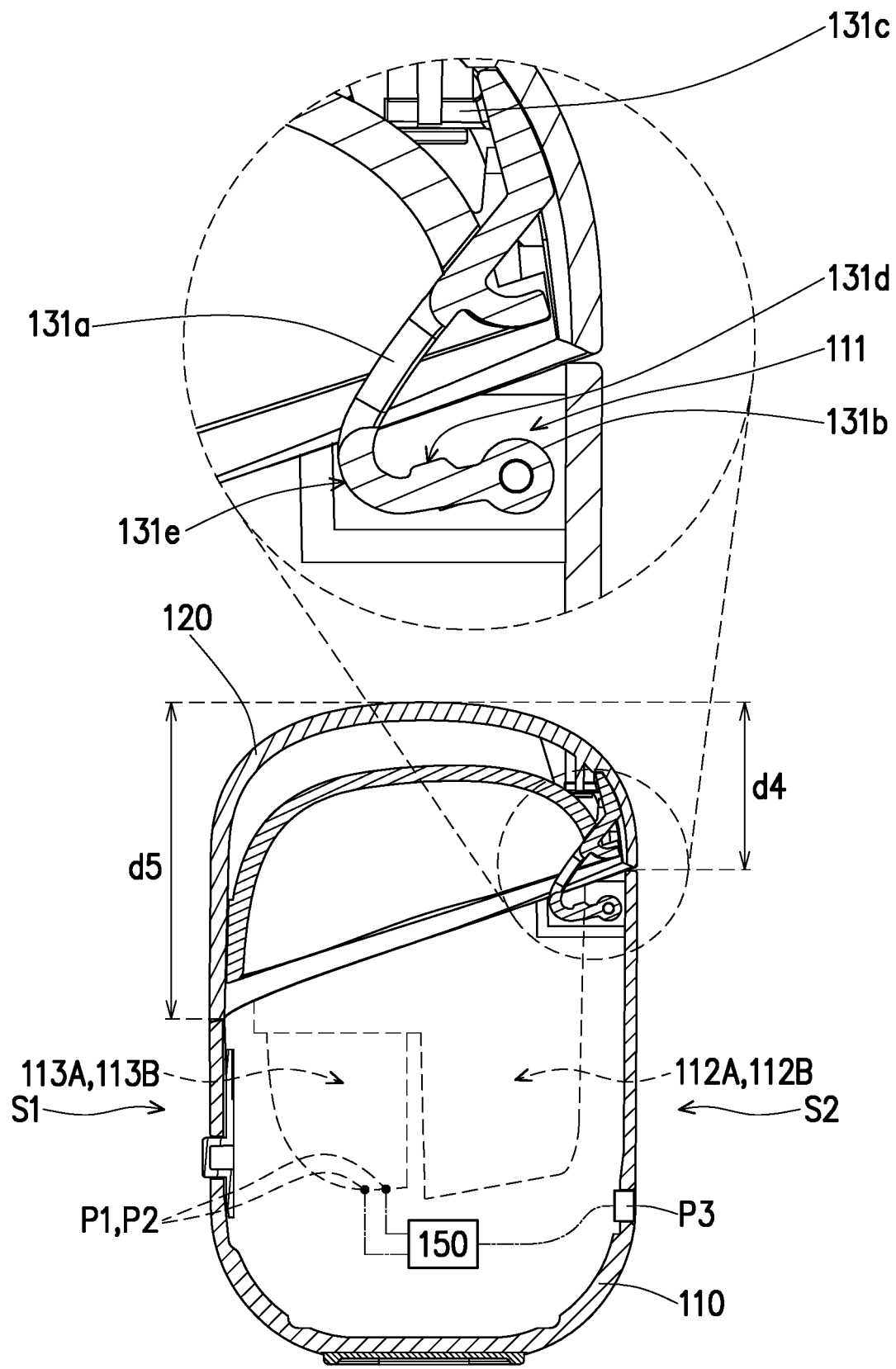
FIG. 3A and FIG. 3B are respectively cross-sectional views of partial components of the receiving box for hearing assistance devices.
Figure 3B:
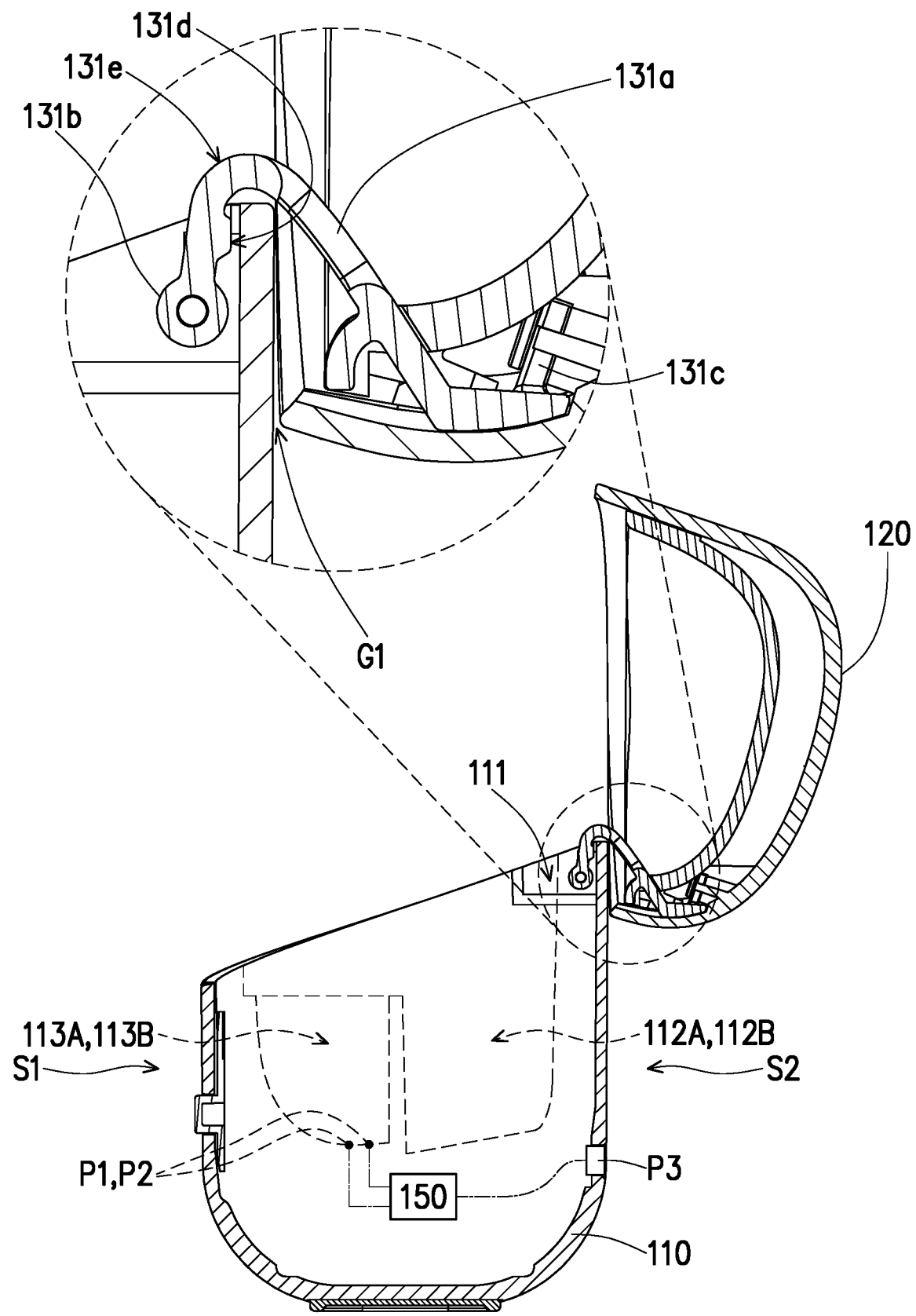

FIG. 3A and FIG. 3B are respectively cross-sectional views of partial components of the receiving box for hearing assistance devices, corresponding to the states as shown in FIG. 1A and FIG. 1B. With reference to FIG. 2, FIG. 3A, and FIG. 3B together, in this embodiment, the L-shaped hinge 130 also includes a turning portion 131e (i.e., a turning section of the L-shaped portion 131a) located between the fixed end and the pivot end. When the cover 120 is closed relative to the housing 110 (as shown in FIG. 3A), the turning portion 131e is received in the hinge recess 111, and the L-shaped hinge 130 is completely shielded in the cover 120 and the housing 110. When the cover 120 is unfolded relative to the housing 110 such that the hearing assistance devices is be adapted to be taken out, the turning portion 131e is moved out of the hinge recess 111. The L-shaped hinge 130 also includes an abutting portion 131d located between the two ends and is adjacent to the housing 110. When the cover 120 is closed relative to the housing 110, the abutting portion 131d is received in the hinge recess 111. When the cover 120 is unfolded relative to the housing 110 such that the hearing assistance devices is adapted to be taken out, the abutting portion 131d abuts against an inner wall of the housing 110 to form a gap G1 between the cover 120 and the housing 110. As shown in the partially enlarged diagram of FIG. 3B, the gap G1 is adapted to prevent the cover 120 and the housing 110 from colliding and causing damage to each other. That is to say, the cover 120 takes the abutting portion 131d of the L-shaped hinge 130 as a stop for its unfolding stroke relative to the housing 110.

Besides, in this embodiment, the receiving box 100 for hearing assistance devices further includes a charging module 150, which is disposed in the housing 110. The charging module 150 includes a plurality of electrical contacts P1, P2 located in the receiving slots 113A, 113B, and the charging module 150 also includes an electrical connector P3 disposed on a surface of the housing 110. The electrical connector P3 is configured to receive from an external power source, so that when placed in the receiving slots 113A, 113B, hearing assistance devices may perform power transmission (charge or discharge) through the electrical contacts P1, P2.

It is also notable that, as shown in FIG. 3A, the housing 110 includes a front side S1 and a rear side S2 opposite to each other. The L-shaped hinge 130 is located on the rear side S2, and the receiving slots 113A, 113B are adjacent to the front side S1. The cover 120 is closed relative to the housing 110 to form an opening seam. On the front side S1, the opening seam is lower than the pivoting place between the L-shaped hinge 130 and the housing 110, and on the rear side S2, the opening seam is higher than the pivoting place between the L-shaped hinge 130 and the housing 110. From a top portion of the cover 120 as reference, the opening seam is at a relative distance d5 on the front side S1 and a relative distance d4 on the rear side S2, and the relative distance d5 is greater than the relative distance d4, which means that the opening seam is inclined as being low on the front side S1 and being high on the rear side S2. In this way, it is convenient for the user to hold the receiving box 100 for hearing assistance devices in one hand with the thumb abutting the front side S1 and the remaining four fingers abutting the rear side S2, and it facilitates driving the cover 120 to be opened by the thumb and driving the cover 120 to be closed by the index finger.

Figure 4A:
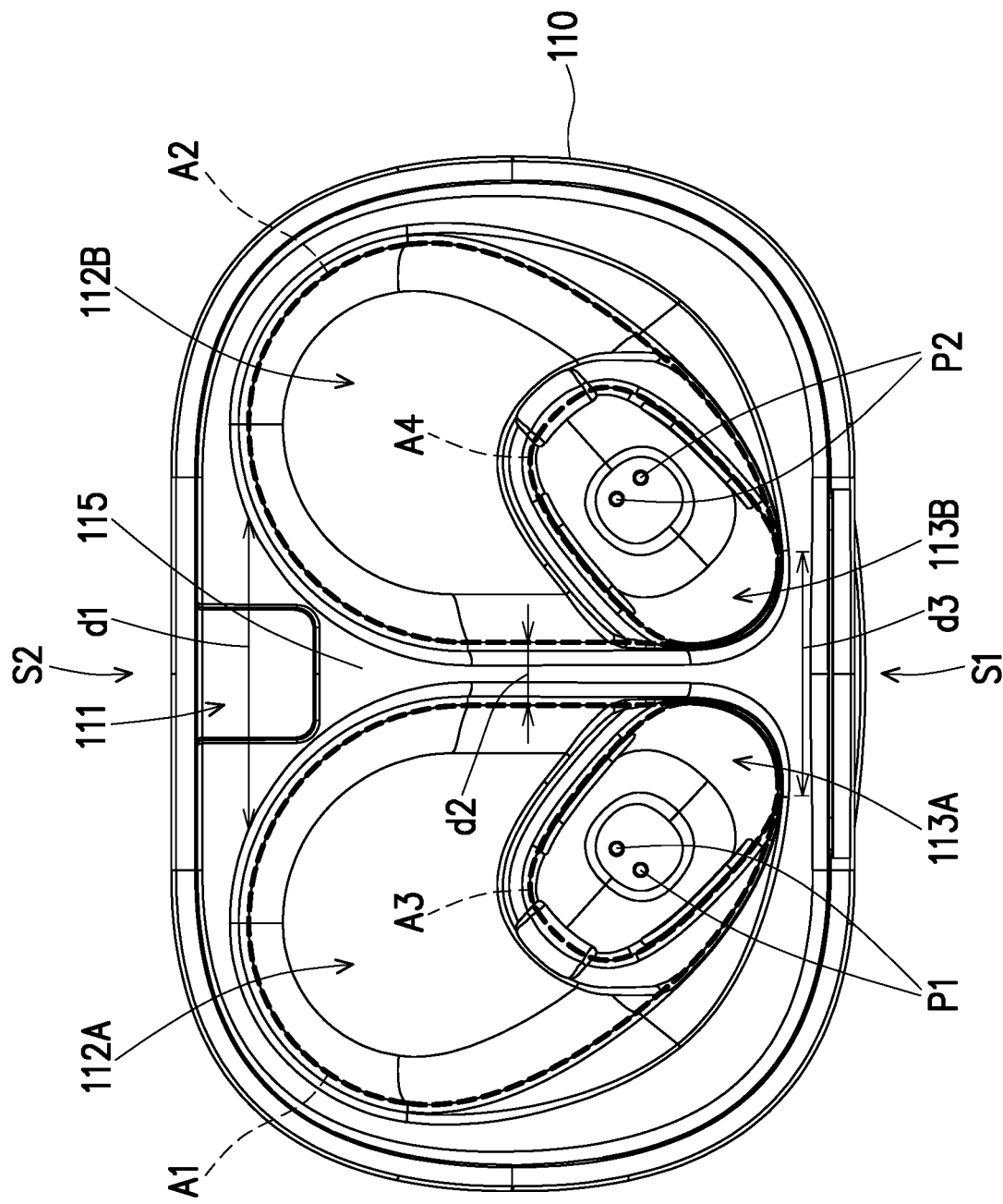
FIG. 4A is a top view of partial components of the receiving box for hearing assistance devices.
Figure 4B:
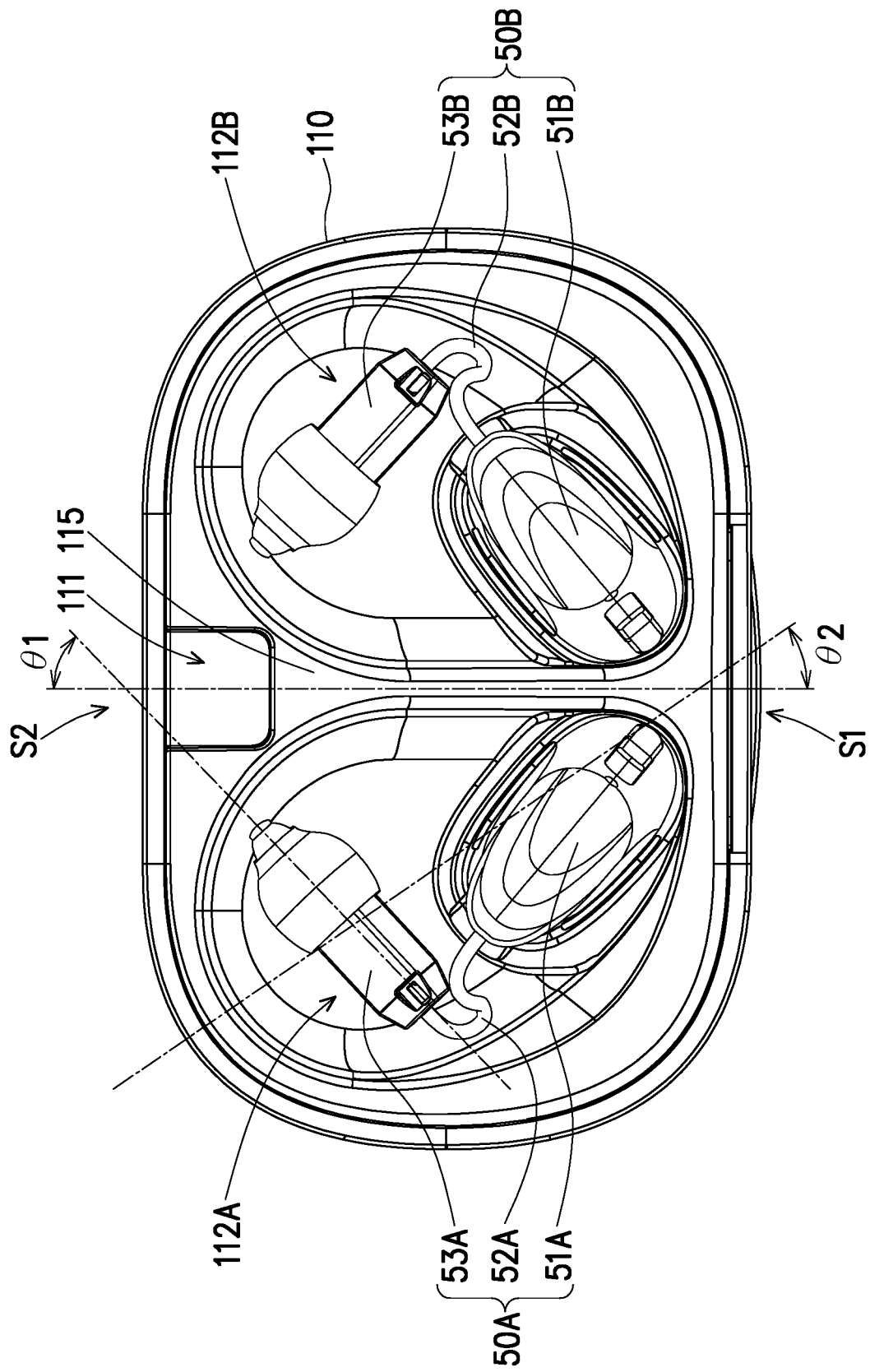
FIG. 4B is a top view of partial components of the receiving box with hearing assistance devices placed therein.

FIG. 4A is a top view of partial components of the receiving box for hearing assistance devices. FIG. 4B is a top view of partial components of the receiving box with hearing assistance devices placed therein. With reference to FIG. 1A, FIG. 4A, and FIG. 4B together, in this embodiment, the housing 110 also includes two wire receiving slots 112A, 112B. The receiving slots 113A, 113B are respectively located in the wire receiving slots 112A, 112B. The receiving slot 113A and the wire receiving slot 112A are spaced apart by a slot wall of the receiving slot 113A, and the receiving slot 113B and the wire receiving slot 112B are spaced apart by a slot wall of the receiving slot 113B. As shown in FIG. 4B, hearing assistance devices 50A, 50B respectively include bodies 51A, 51B, receivers 53A, 53B, and cables 52A, 52B. The cables 52A, 52B are electrically connected between the bodies 51A, 51B and the receivers 53A, 53B. In addition, the bodies 51A, 51B are adapted to be placed in the receiving slots 113A, 113B, and the cables 52A, 52B and the receivers 53A, 53B are adapted to be placed in the wire receiving slots 112A, 112B. As shown in FIG. 1A, slot openings of the wire receiving slots 112A, 112B are higher than slot openings of the receiving slots 113A, 113B, and a slot depth of the wire receiving slots 112A, 112B is thus greater than a slot depth of the receiving slots 113A, 113B. In addition, for the hearing assistance devices 50A, 50B, a height of the bodies 51A, 51B is greater than the slot depth of the receiving slots 113A, 113B, and therefore, when placed in the receiving slots 113A, 113B, upper halves of the bodies 51A, 51B protrude above the slot openings of the receiving slots 113A, 113B, which is convenient for the user to grasp or place the hearing assistance devices 50A, 50B.

Moreover, in this embodiment, the two wire receiving slots 112A, 112B are disposed independent of each other. Furthermore, the housing 110 also includes a partition wall 115 located between the two wire receiving slots 112A, 112B. The partition wall 115 is of a thickness d1 on the rear side S2, a thickness d3 on the front side S1, and a thickness d2 in a middle, and d1>d3>d2. Herein, the middle is located between the front side S1 and the rear side S2. A slot width of the wire receiving slots 112A, 112B is gradually increased from the front side S1 toward the rear side S2. In addition, at a place adjacent to the front side S1, a slot wall of the wire receiving slot 112A partially overlaps the slot wall of the receiving slot 113A, and a slot wall of the wire receiving slot 112B partially overlap the slot wall of the receiving slot 113B, thus forming a configuration direction while also effectively reducing a volume of the housing 110. In addition, since the cables 52A, 52B of the hearing assistance devices 50A, 50B extend from the bodies 51A, 51B to form L-shaped turns, and are connected to the receivers 53A, 53B, the hearing assistance devices 50A, 50B thus conform to the configuration direction. Moreover, in this embodiment, the two receiving slots 113A, 113B and the two wire receiving slots 112A, 112B form two configuration directions that are exhibited as mirror-symmetrical with each other.

The configuration direction is further described as follows. As shown in FIG. 4B, taking one hearing assistance device 50A as an example, the housing 110 also has a center line passing through the front side S1 and the rear side S2, an angle θ1 is present between an orientation of receiver 53A of the hearing assistance device 50A and the center line, and the angle θ1 is 30 degrees to 45 degrees. At the same time, taking the wire receiving slot 112A as an example then, an angle θ2 is present between an axial direction of a long axis of the wire receiving slot 112A and the center line, and the angle θ2 is 30 degrees to 45 degrees. Through the above-mentioned configuration direction, a shape and dimension of the housing 110 as shown in FIG. 4A can be accordingly defined, so that the user smoothly holds the receiving box 100 for hearing assistance devices as shown in FIG. 4A in one hand, similarly with the thumb abutting the front side S1 and the remaining four fingers abutting the rear side S2, to conveniently open the cover 120 by the thumb or close the cover 120 by the index finger. At the same time, for the user, the hearing assistance devices 50A, 50B conforming to the configuration direction namely means that the user may directly wear them on the ears after taking them out of the receiving box for hearing assistance devices, without further adjusting a wearing position of the hearing assistance devices 50A, 50B relative to the ears of the user.

In addition, in this embodiment, the wire receiving slots 112A, 112B respectively have slot opening areas A1, A2, and the receiving slots 113A, 113B respectively have slot opening areas A3, A4. Herein, the slot opening areas A1, A2 are greater than or equal to twice the slot opening areas A3, A4. In this way, the hearing assistance devices 50A, 50B adapted for this disclosure match cables 52A, 52B with different sizes. Moreover, since a length of the matched cables 52A, 52B may be adjusted, the hearing assistance devices 50A, 50B with the same bodies 51A, 51B are adapted for users with different ear sizes.

Figure 5A:
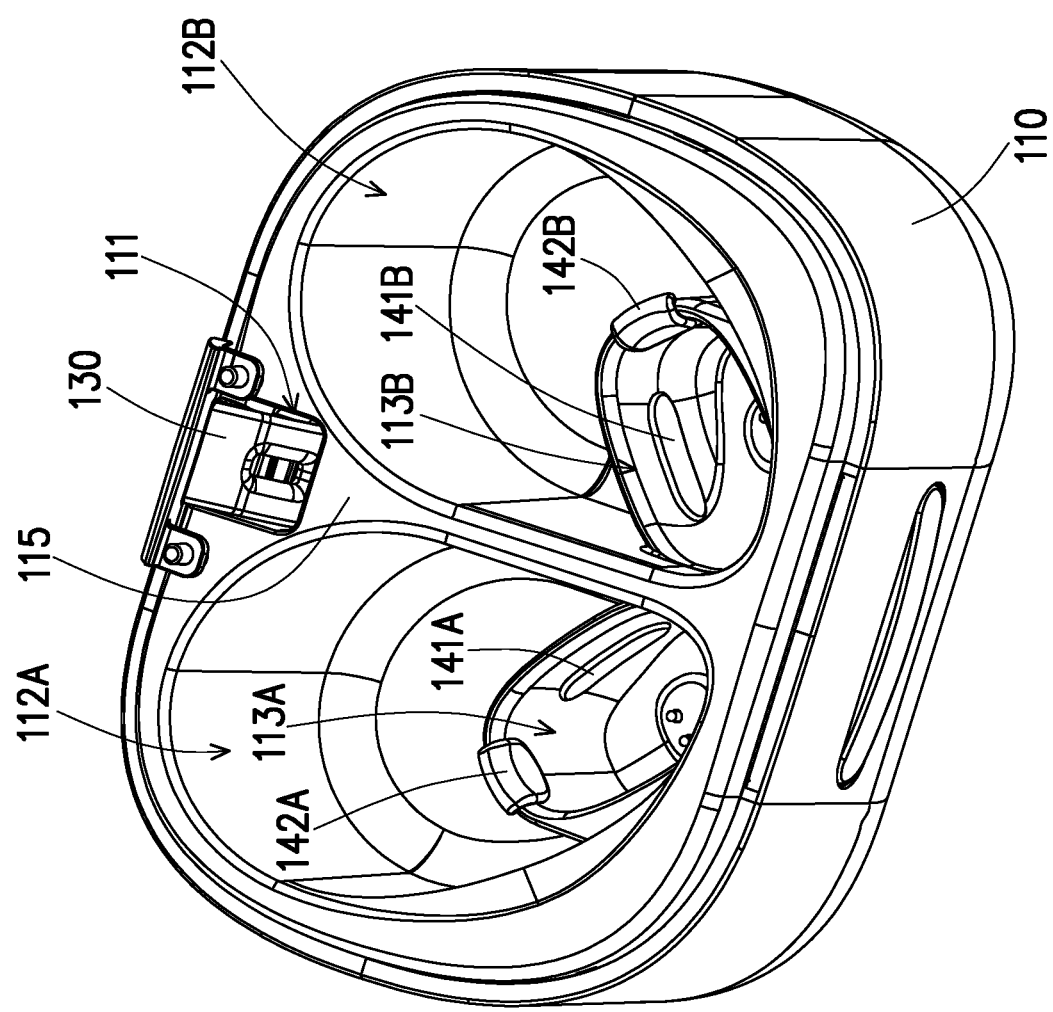
FIG. 5A and FIG. 5B are respectively schematic diagrams of partial components of the receiving box for hearing assistance devices.
Figure 5B:
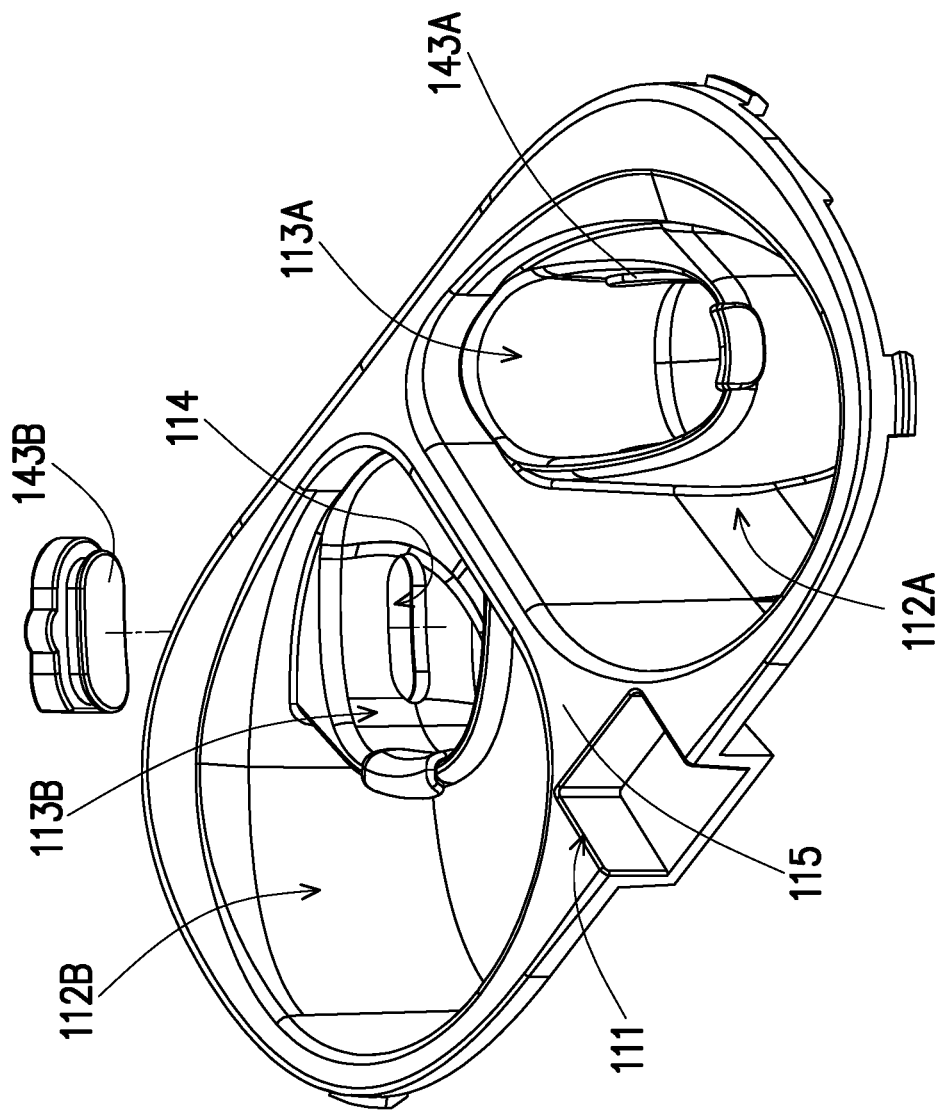

FIG. 5A and FIG. 5B are respectively schematic diagrams of partial components of the receiving box for hearing assistance devices. With reference to FIG. 5A and FIG. 5B together, in this embodiment, the receiving box 100 for hearing assistance devices also includes a plurality of pads 141A, 141B, 142A, 142B, 143A, 143B respectively disposed in the receiving slots 113A, 113B. Herein, the pads 141A, 141B, 143A, 143B are located on the slot walls of the receiving slots 113A, 113B, and the pads 142A, 142B are located on edges of the slot openings of the receiving slots 113A, 113B. The pads are configured to prevent hearing assistance devices (e.g., 50A, 50B) from tilting backward (e.g., tilting toward the rear side S2) through pushing the hearing assistance devices forward (e.g., toward the front side S1) so that the hearing assistance devices are in normal contact with the electrical contacts P1, P2. Furthermore, the slot walls of the receiving slots 113A, 113B include two opposite wall portions with a larger curvature and two opposite wall portions with a smaller curvature, and the two opposite wall portions with the larger curvature and the two opposite wall portions with the smaller curvature form a closed contour. Herein, the pads 141A, 141B, 143A, 143B are located on the two opposite wall portions with smaller curvature. In this way, the pads 141A, 141B, 143A, 143B maintain a degree of adhesion to the receiving slots 113A, 113B, and are less likely to fall off due to overly bending, deformation, or the like, the hearing assistance devices 50A, 50B are also maintained to be firmly standing in the receiving slots 113A, 113B, and the hearing assistance devices (e.g., 50A, 50B) are prevented from tilting backward when being pushed forward, so that the hearing assistance devices are in normal contact with the electrical contacts P1, P2. At the same time, this also avoids excessive interference with the hearing assistance devices 50A, 50B that leads to inconvenience for the user to pull the hearing assistance devices 50A, 50B out of the receiving slots 113A, 113B.

Moreover, a bonding degree between the pads 141A, 141B, 143A, 143B and the slot walls of the receiving slots 113A, 113B of the receiving box for the hearing assistance devices is further taken into consideration. Therefore, in this embodiment, the pads 141A, 141B are attached to the slot walls from an inside of the receiving slots 113A, 113B. In addition, as shown in FIG. 5B, the pads 143A, 143B pass from an outside of the receiving slots 113A, 113B through openings 114 of the slot walls to be assembled on the slot walls. For example, after the pads 143A, 143B pass through the opening 114 from the outside, an adhesive is applied to the outside, so that the pads 143A, 143B are attached to the slot walls, thereby simplifying the process of attaching the pads 143A, 143B.

Figure 6:
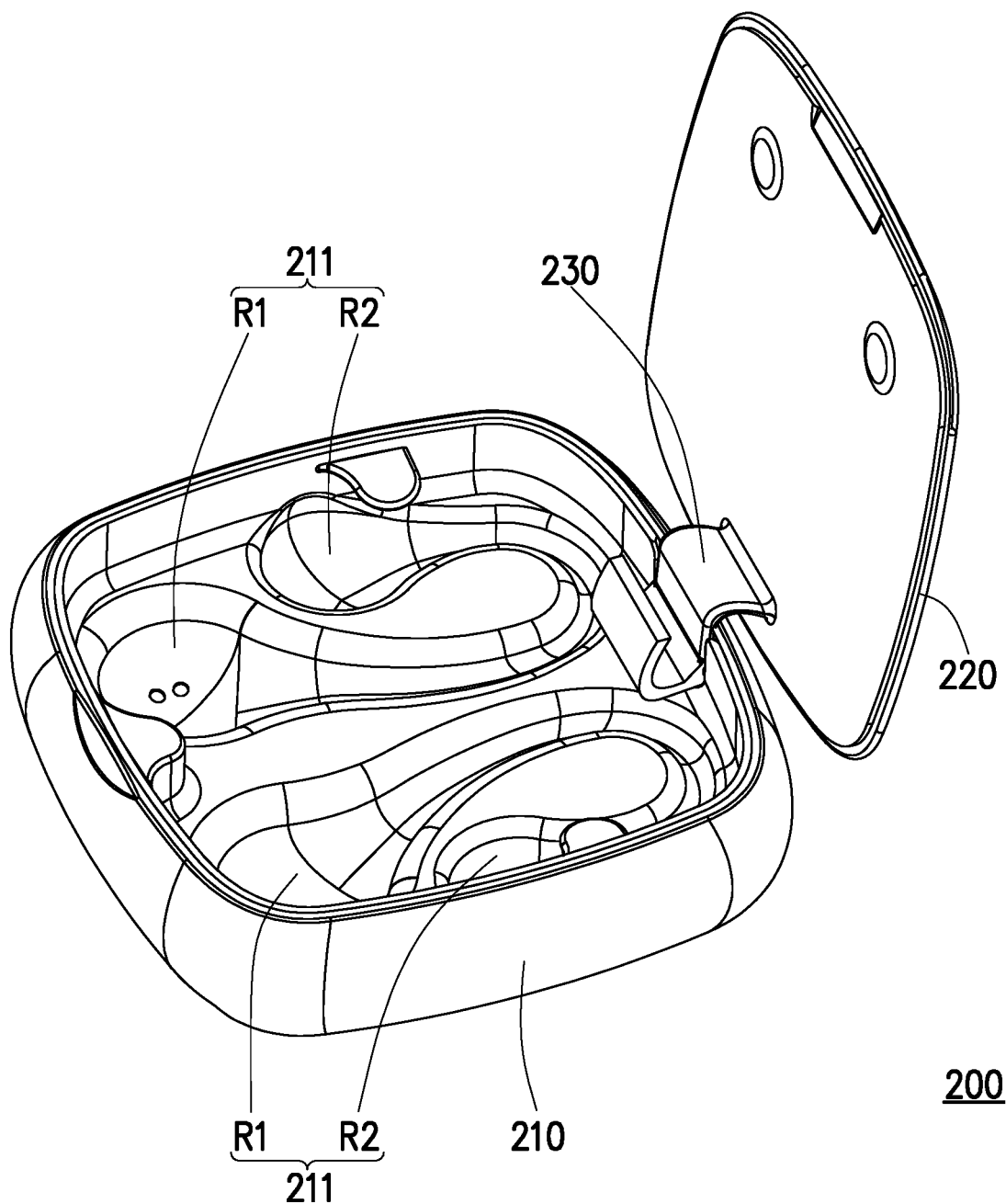
FIG. 6 is a schematic diagram of a receiving box for hearing assistance devices according to another embodiment of the disclosure.

FIG. 6 is a schematic diagram of a receiving box for hearing assistance devices according to another embodiment of the disclosure. With reference to FIG. 6, in this embodiment, in a receiving box 200 for hearing assistance devices, a housing 210 and a cover 220 are similarly pivoted to each other through an L-shaped hinge 230 to form a clamshell configuration. Furthermore, the housing 210 includes two recesses 211, which respectively include a local portion R1 and a local portion R2. Herein, the local portion R1 is configured to receive a body of the hearing assistance device, and is also adapted for charge or discharge through electrical contacts, and the local portion R2 is configured to receive a receiver and a cable of the hearing assistance device. That is to say, for a single hearing assistance device, the receiving slots and the wire receiving slots of the foregoing embodiment are substantially integrated as one, absent a slot wall separating them in this embodiment.

Figure 7A:
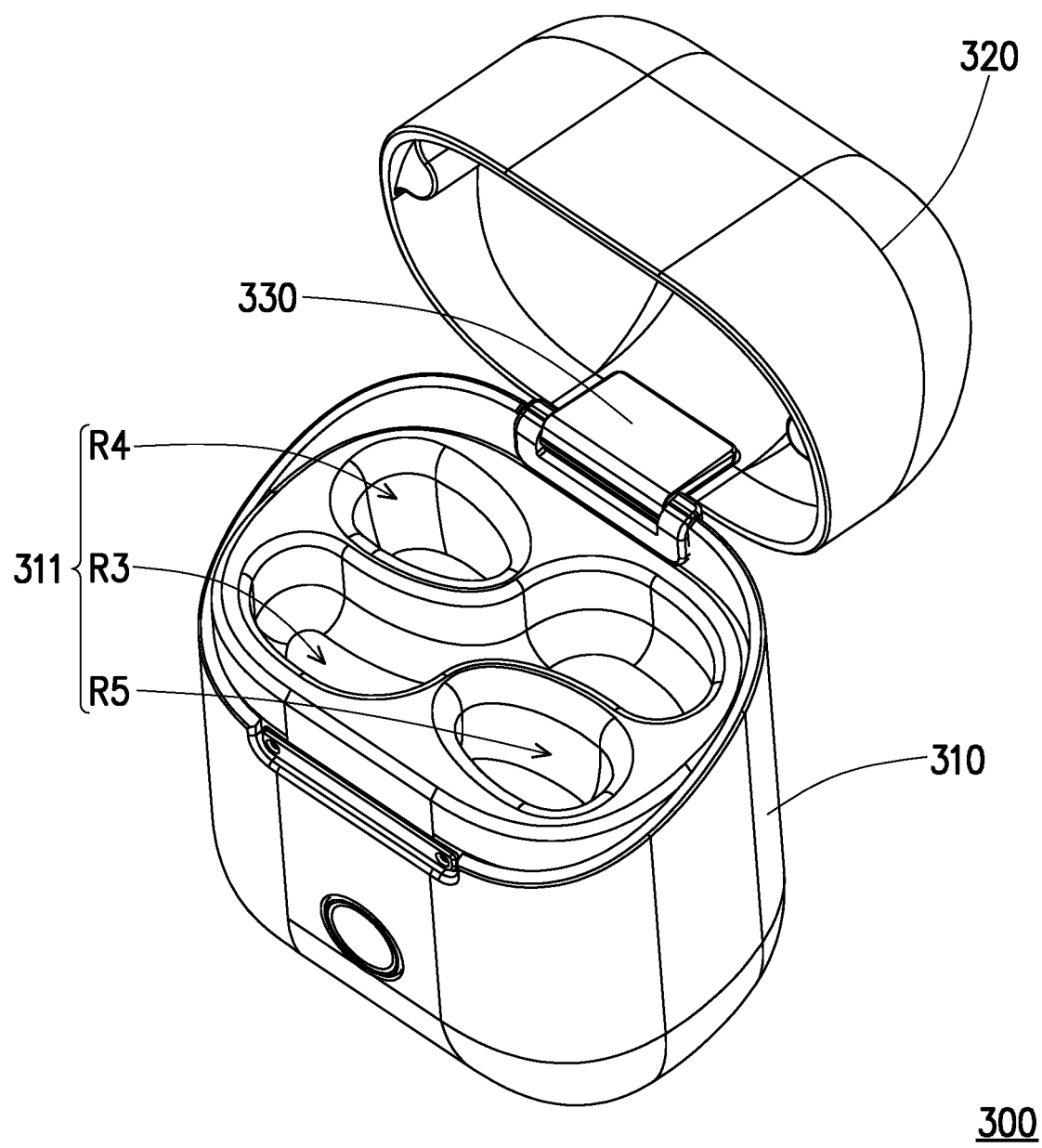
FIG. 7A is a schematic diagram of a receiving box for hearing assistance devices according to another embodiment of the disclosure.
Figure 7B:
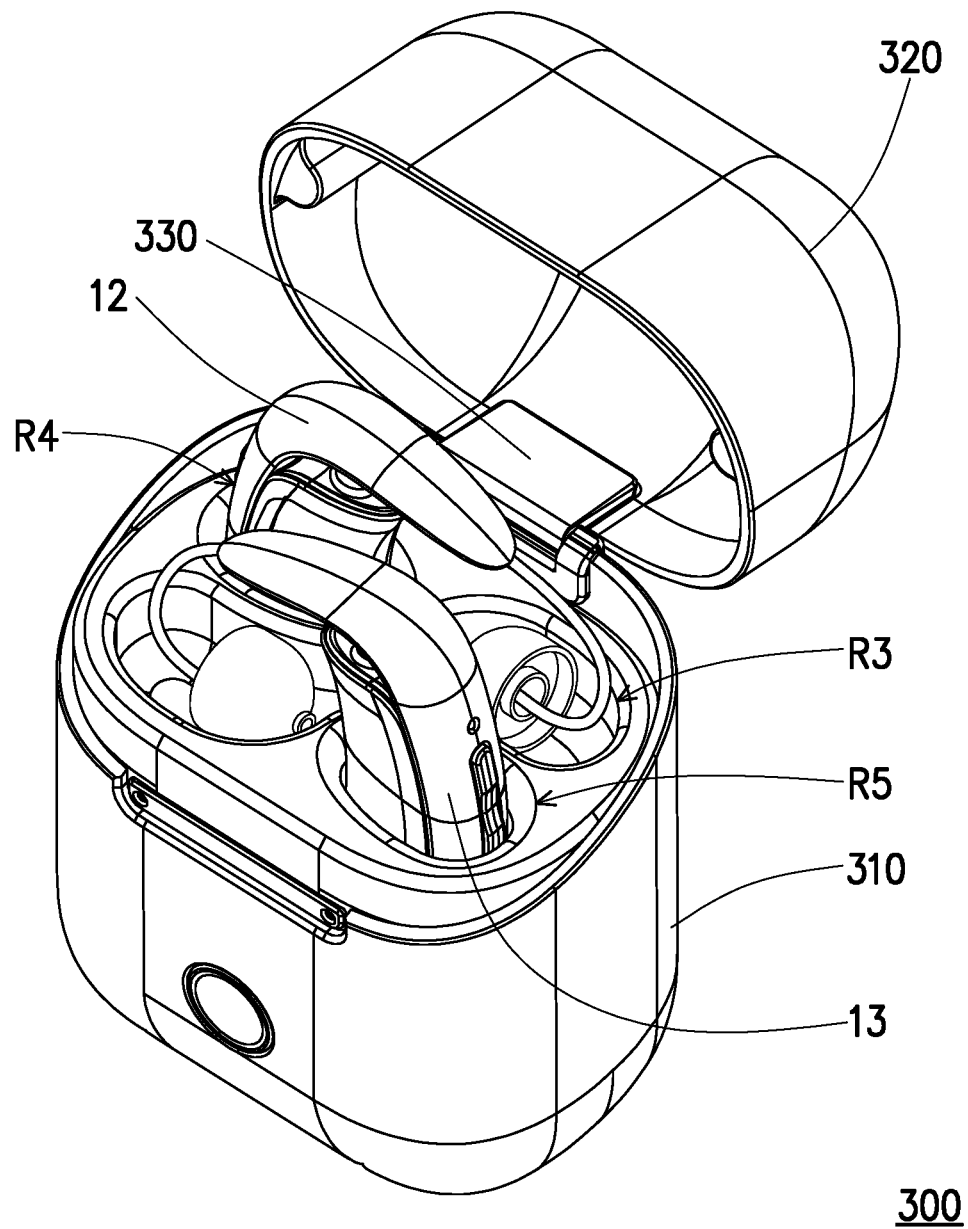
FIG. 7B is a schematic diagram of the receiving box of FIG. 7A with hearing assistance devices placed therein.

FIG. 7A is a schematic diagram of a receiving box for hearing assistance devices according to another embodiment of the disclosure. FIG. 7B is a schematic diagram of the receiving box of FIG. 7A with hearing assistance devices placed therein. With reference to FIG. 7A and FIG. 7B together, in this embodiment, in a receiving box 300 for hearing assistance devices, a housing 310 and the cover 320 are similarly pivoted to each other through an L-shaped hinge 330 to form a clamshell configuration. Different from the foregoing embodiment, the housing 310 of this embodiment includes a receiving slot 311, which is further divided into three open chambers R3, R4, and R5 independent of each other. Herein, the open chamber R4 and the open chamber R5 (similar to the receiving slot in the foregoing embodiment) are configured to respectively receive bodies of hearing assistance devices 12 and 13. In addition, the open chamber R3 (similar to the wire receiving slot in the foregoing embodiment) is located between the open chambers R4, R5, and is configured to receive receivers and cables of the hearing assistance devices 12 and 13. Herein, the open chamber R3 includes a neck portion, the open chambers R4, R5 are adjacent to the neck portion, and the open chambers R4, R5 face each other being spaced apart by the neck portion.

Moreover, a depth of the open chambers R4, R5 is greater than a depth of the open chamber R3. However, similar to the foregoing embodiment, the depth of the open chambers R4, R5 is smaller than a height of the bodies of the hearing assistance devices 12, 13, so that as shown in FIG. 7B, upper halves of the bodies of the hearing assistance devices 12, 13 smoothly protrude above the open chambers R4, R5, which is convenient for the user to take or place the hearing assistance devices 12, 13.

In summary of the foregoing, in the embodiment of the disclosure, the receiving box for hearing assistance devices includes the housing, the cover, the L-shaped hinge, and the charging module. One end of the L-shaped hinge is pivoted to the housing and the other end is fixed to the cover, forming the clamshell configuration. Moreover, the L-shaped hinge is pivotally disposed in the hinge recess of the housing, and thus exhibits a visual effect of hidden storage.

Furthermore, the housing includes two receiving slots independent of each other, and the charging module disposed in the housing includes the electrical contacts exposed from the receiving slots, so that the hearing assistance devices may perform power transmission (charge or discharge) through the electrical contacts. In one of the embodiments, the housing also includes wire receiving slots, and the receiving slots respectively overlap the wire receiving slots to form two cavities independent of each other. In the cavities, the slot openings of the wire receiving slots are higher than the slot openings of the receiving slots, and the slot opening area of the wire receiving slots is greater than or equal to twice the slot opening area of the receiving slots. In addition, in accordance with the user's habit, the configuration directions are formed as inclined and mirror-symmetrical with each other. Correspondingly, the cable of the hearing assistance devices extends from the body to form an L-shaped turn, and is then connected to the receiver to conform to the configuration directions. In this way, the user may immediately wear the hearing assistance devices on the ears after taking them out of the housing, without further adjusting the fitting position.

Accordingly, the receiving box for hearing assistance devices is adapted for both receiving and charging the hearing assistance devices on the configuration basis of the above-mentioned components and the ergonomic design condition.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A receiving box for two hearing assistance devices, comprising:
    a housing comprising a hinge recess, two receiving slots, and two wire receiving slots located between the two receiving slots, wherein the two receiving slots are independent of each other and are configured to respectively receive the hearing assistance devices;
    a cover; and
    an L-shaped hinge comprising two opposite ends, one end being pivoted in the hinge recess of the housing, and the other end being fixed to the cover, and a plurality of pads respectively disposed in the two receiving slots.

2. The receiving box for two hearing assistance devices according to claim 1, further comprising a charging module disposed in the housing.

3. The receiving box for two hearing assistance devices according to claim 2, wherein the charging module includes a plurality of electrical contacts located in the two receiving slots.

4. The receiving box for two hearing assistance devices according to claim 1, wherein the L-shaped hinge further includes a turning portion located between the two ends.

5. The receiving box for two hearing assistance devices according to claim 4, wherein when the cover is closed relative to the housing, the turning portion is received in the hinge recess, and the L-shaped hinge is completely shielded in the cover and the housing.

6. The receiving box for two hearing assistance devices according to claim 4, wherein when the cover is unfolded relative to the housing, the turning portion is moved out of the hinge recess.

7. The receiving box for two hearing assistance devices according to claim 1, wherein the L-shaped hinge further includes an abutting portion located between the two ends and adjacent to the housing.

8. The receiving box for two hearing assistance devices according to claim 7, wherein when the cover is closed relative to the housing, the abutting portion is received in the hinge recess.

9. The receiving box for two hearing assistance devices according to claim 7, wherein when the cover is unfolded relative to the housing, the abutting portion abuts against an inner wall of the housing to form a gap between the cover and the housing.

10. The receiving box for two hearing assistance devices according to claim 1, wherein the housing further includes a front side and a rear side opposite to each other.

11. The receiving box for two hearing assistance devices according to claim 10, wherein the two receiving slots are adjacent to the front side.

12. The receiving box for two hearing assistance devices according to claim 10, wherein the L-shaped hinge is located on the rear side.

13. The receiving box for two hearing assistance devices according to claim 12, wherein when the cover is closed relative to the housing, an opening seam is formed.

14. The receiving box for two hearing assistance devices according to claim 13, wherein the opening seam is lower than the one end on the front side.

15. The receiving box for two hearing assistance devices according to claim 13, wherein the opening seam is higher than the one end on the rear side.

16. The receiving box for two hearing assistance devices according to claim 10, wherein the two wire receiving slots configured to respectively receive cables and receivers of the hearing assistance devices.

17. The receiving box for two hearing assistance devices according to claim 16, wherein the two receiving slots and the two wire receiving slots are mirror-symmetrical with each other.

18. The receiving box for two hearing assistance devices according to claim 16, wherein a slot depth of the two wire receiving slots is greater than a slot depth of the two receiving slots.

19. The receiving box for two hearing assistance devices according to claim 16, wherein slot openings of the two wire receiving slots are higher than slot openings of the two receiving slots.

20. The receiving box for two hearing assistance devices according to claim 16, wherein the two wire receiving slots comprise a neck portion, and the two receiving slots are adjacent to the neck portion.

21. The receiving box for two hearing assistance devices according to claim 16, wherein a slot opening width of the two wire receiving slots is gradually increased from the front side toward the rear side.

22. The receiving box for two hearing assistance devices according to claim 16, wherein a slot opening area of the two wire receiving slots is greater than or equal to twice a slot opening area of the two receiving slots.

23. The receiving box for two hearing assistance devices according to claim 16, wherein the two wire receiving slots are independent of each other.

24. The receiving box for two hearing assistance devices according to claim 23, wherein the housing further includes a partition wall is located between the two wire receiving slots.

25. The receiving box for two hearing assistance devices according to claim 24, wherein a thickness of the partition wall on the rear side is d1, a thickness of the partition wall on the front side is d3, a thickness of the partition wall between the front side and the rear side is d2, and $d1 > d3 > d2$.

26. The receiving box for two hearing assistance devices according to claim 16, wherein the two receiving slots are respectively located in the two wire receiving slots.

27. The receiving box for two hearing assistance devices according to claim 26, wherein the two wire receiving slots are located adjacent to the front side respectively with the two receiving slots.

28. The receiving box for two hearing assistance devices according to claim 26, wherein slot walls of the two wire receiving slots partially overlap slot walls of the two receiving slots.

29. The receiving box for two hearing assistance devices according to claim 16, wherein the two wire receiving slots and the two receiving slots are independent of each other.

30. The receiving box for two hearing assistance devices according to claim 16, wherein the two receiving slots are located between the two wire receiving slots.

31. The receiving box for two hearing assistance devices according to claim 16, wherein the housing further has a center line passing through the font side and the rear side.

32. The receiving box for two hearing assistance devices according to claim 31, wherein an angle is present between an axial direction of a long axis of the two wire receiving slots and the center line.

33. The receiving box for two hearing assistance devices according to claim 32, wherein a range of the angle is 30 degrees to 45 degrees.

34. The receiving box for two hearing assistance devices according to claim 1, wherein the plurality of pads are located on edges of slot openings of the two receiving slots.

35. The receiving box for two hearing assistance devices according to claim 1, wherein the plurality of pads are located on slot walls of the two receiving slots.

36. The receiving box for two hearing assistance devices according to claim 35, wherein the plurality of pads are attached to the slot walls from an inside of the two receiving slots.

37. The receiving box for two hearing assistance devices according to claim 35, wherein the plurality of pads pass from an outside of the two receiving slots through openings of the slot walls to be assembled on the slot walls.

38. The receiving box for two hearing assistance devices according to claim 35, wherein the slot walls of the two receiving slots comprise two opposite wall portions with a larger curvature and two opposite wall portions with a smaller curvature.

39. The receiving box for two hearing assistance devices according to claim 38, wherein the two opposite wall portions with the larger curvature and the two opposite wall portions with the smaller curvature form a closed contour.

40. The receiving box for two hearing assistance devices according to claim 38, wherein the plurality of pads are located on the two opposite wall portions with the smaller curvature.

* * * * *